United States Patent [19]

Kenmotsu

[11] Patent Number: 5,050,159
[45] Date of Patent: Sep. 17, 1991

[54] DOUBLE-SIDES PLAYABLE DISC PLAYER

[75] Inventor: Isami Kenmotsu, Tokorozawa, Japan

[73] Assignee: Pioneer Electronic Corporation, Tokyo, Japan

[21] Appl. No.: 216,211

[22] Filed: Jul. 6, 1988

[30] Foreign Application Priority Data

Dec. 15, 1987 [JP] Japan .................. 62-190267[U]
Dec. 18, 1987 [JP] Japan .................. 62-320558

[51] Int. Cl.$^5$ ........................................ G11B 17/28
[52] U.S. Cl. ................... 369/270; 369/75.1; 369/75.2; 369/77.1; 369/77.2
[58] Field of Search .............. 369/176, 270–271, 369/264, 282, 75.1, 75.2, 77.1, 77.2, 292; 360/99.02–99.07

[56] References Cited

U.S. PATENT DOCUMENTS

| 4,450,549 | 5/1984 | Ikedo et al. | 369/77.1 X |
| 4,470,136 | 9/1984 | Takahashi et al. | 369/77.1 |
| 4,486,873 | 12/1984 | Takahashi et al. | 369/270 X |
| 4,497,051 | 1/1985 | Takahashi et al. | 369/77.1 |
| 4,759,008 | 7/1988 | Hirano et al. | 369/75.2 |
| 4,811,324 | 3/1989 | Ikedo et al. | 369/75.2 |
| 4,841,518 | 6/1989 | Nozu et al. | 369/270 |
| 4,853,924 | 8/1989 | Takahashi et al. | 369/270 |

Primary Examiner—William M. Shoop, Jr.
Assistant Examiner—David Martin
Attorney, Agent, or Firm—Fleit, Jacobson, Cohn, Price, Holman & Stern

[57] ABSTRACT

A double-sides playable disc player for playing back an information recording disk composed of a pair of circular base plates having signal recording layers, respectively, has a disc centering device for centering the information recording disc with respect to a turntable. The disc centering device comprises a first centering member fittable into the central hole of one of the circular base plates for centering the circular base plate with respect to the turntable, a second centering member fittable into the central hole of the other circular base plate for centering the other circular base plate with respect to the turntable, and a drive assembly for moving the first and second centering members. Even if the circular base plates are displaced with respect to each other, they can accurately be centered with respect to the turntable at all times. The components of the drive assembly double as components of a disc clamp mechanism, so that the disc player is of a low cost.

3 Claims, 8 Drawing Sheets

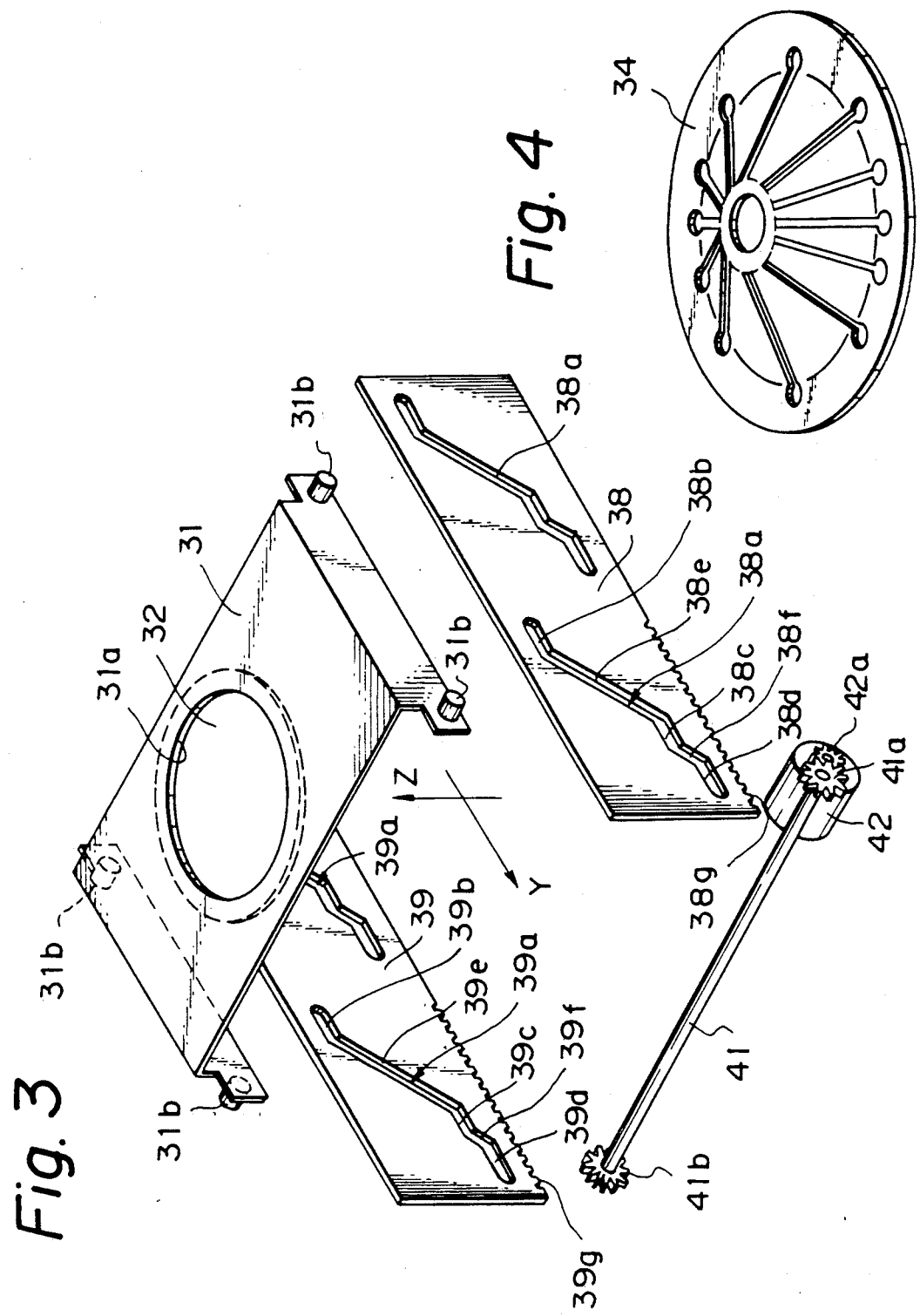

DOUBLE-SIDES PLAYABLE DISC PLAYER

BACKGROUND OF THE INVENTION

1. Field of the Invention

The present invention relates to a double-sides playable disc player which can play back both sides of an information recording disc composed of a pair of circular base plates each having a signal recording layer, without turn-over of the disc once loaded.

2. Description of the Prior Art

Optical information recording discs such as video discs and DRAW (Direct Read After Write) discs contain information which is recorded as a multiplicity of minute depressions or pits produced by a laser beam spot. With such an optical information recording disc, it is important to protect a layer in which the pits are defined, i.e., a signal recording layer. One known arrangement for projecting a signal recording layer includes an optical information recording disc comprising a pair of circular base plates having respective signal recording layers, the circular base plates being coupled to each other with the signal recording layers inside.

FIG. 1 of the accompanying drawings fragmentarily illustrates a conventional double-sides playable disc player for playing back both sides of such an information recording disc without turn-over of the disc once loaded. FIG. 1 shows a disc clamp mechanism for clamping the disc on a turntable and a disc centering device for centering the disc with respect to the turntable. As shown in FIG. 1, the disc centering device comprises a centering member 4 axially slidably mounted on a drive shaft 3 of the turntable 2 and having a tapered surface 1 on an outer periphery thereof, a coil spring 5 disposed between the centering member 4 and the turntable 2, and a ring stopper 6 for retaining the centering member 4 on the drive shaft 3 against removal. The disc clamp mechanism includes a cup-shaped presser 8 rotatably mounted on a support member 12 by a ball 10 and a ball seat 11. The presser 8 can be brought into and out of engagement with an information recording disc 9 placed on the turntable 2 by vertical movement of the support member 12.

As described above, the disc 9 comprises a pair of circular base plates having respective signal recording layers 13, 14 and respective central holes and coupled to each other with the signal recording layers 13, 14 inside.

With the conventional double-sides playable disc player of the illustrated construction, the disc 9 can be centered with respect to the turntable 2 by placing the tapered surface 1 of the centering member 4 into the central hole of the disc 9 when the disc 9 is clamped on the turntable 2 by the disc clamp mechanism. Information can then be recorded on and reproduced from the signal recording layer of one circular base plate 13 by a recording/reproducing unit 16. Similarly, information can be recorded on and reproduced from the signal recording layer of the other circular base plate 14 by another recording/reproducing unit 17 without turning over the disc 9.

If the circular base plates 13, 14 joined to each other are displaced e from each other, then it may be possible to smoothly record information on and reproduce information from the signal recording layer of the circular base plate 13 held against the disc carrying surface of the turntable 2, but it may be difficult to smoothly record information on and reproduce information from the signal recording layer of the other circular base plate 14 since its central axis is displaced e from the center of rotation of the turntable 2.

SUMMARY OF THE INVENTION

In view of the aforementioned drawbacks of the conventional double-sides playable disc player, it is an object of the present invention to provide a double-sides playable disc player which is of a low cost and capable of centering a pair of circular base plates of an information recording disc accurately with respect to a turntable even if the circular base plates are displaced from each other.

According to a first aspect of the present invention, there is provided a double-sides playable disc player for playing back an information recording disc composed of a pair of circular base plates having respective signal recording layers and central holes and joined to each other with the signal recording layers inside, the double-sides playable disc player comprising a turntable, a disc centering device for centering the information recording disc with respect to the turntable, and a disc clamp mechanism for pressing the information recording disc against the turntable, the disc clamp mechanism comprising a support member movable in a plane substantially normal to a disc carrying surface of the turntable, drive means for driving the support member, a rotatable member rotatably mounted on the support member, and a presser mounted on the rotatable member through a resilient member for pressing the information recording disc against the disc carrying surface, the disc centering device comprising a first centering member movable into and out of the disc carrying surface along a central axis of rotation of the turntable, the first centering member being fittable in the central hole of one of the circular base plates which is held against the disc carrying surface, urging means for normally urging the first centering member into the disc carrying surface, and a second centering member rotatably mounted on the rotatable member and fittable into the central hole of the other circular base plate, the arrangement being such that when the second centering member is fitted into the central hole of the other circular base plate, the first centering member is moved out of the disc carrying surface of the turntable, the resilient member comprising a spring capable of toggling movement.

According to a second aspect of the present invention, there is provided a double-sides playable disc player for playing back an information recording disc composed of a pair of circular base plates having respective signal recording layers and central holes and joined to each other with the signal recording layers inside, the double-sides playable disc player comprising a turntable and a disc centering device for centering the information recording disc with respect to the turntable, the disc centering device comprising a first centering member movable into and out of a disc carrying surface of the turntable along a central axis of rotation of the turntable, the first centering member being fittable in the central hole of one of the circular base plates which is held against the disc carrying surface, urging means for normally urging the first centering member into the disc carrying surface, a support member movable in a plane substantially normal to the disc carrying surface, drive means for driving the support member, and a second centering member rotatably mounted on the support member and fittable into the central hole of the other circular base plate, the arrangement being such that when the second centering member is fitted into the central hole of the other circular base plate, the first centering member is released from the central hole of said one circular base plate and moved out of the disc carrying surface of the turntable, the drive means comprising a movable member having a cam groove engaging the support member and movable in a prescribed direction, and drive force applying means for applying a drive force to the movable member, the cam groove being of such a profile that when the movable member is moved, the support member is also moved, the cam groove being in the shape of a staircase composed of a plurality of straight portions extending in the direction in which the movable member is movable, and slanted portions contiguous and inclined to the straight portions.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3 and 4 are perspective views of components of the disc clamp mechanism shown in FIG. 2;

DETAILED DESCRIPTION OF THE PREFERRED EMBODIMENTS

Figure 1:
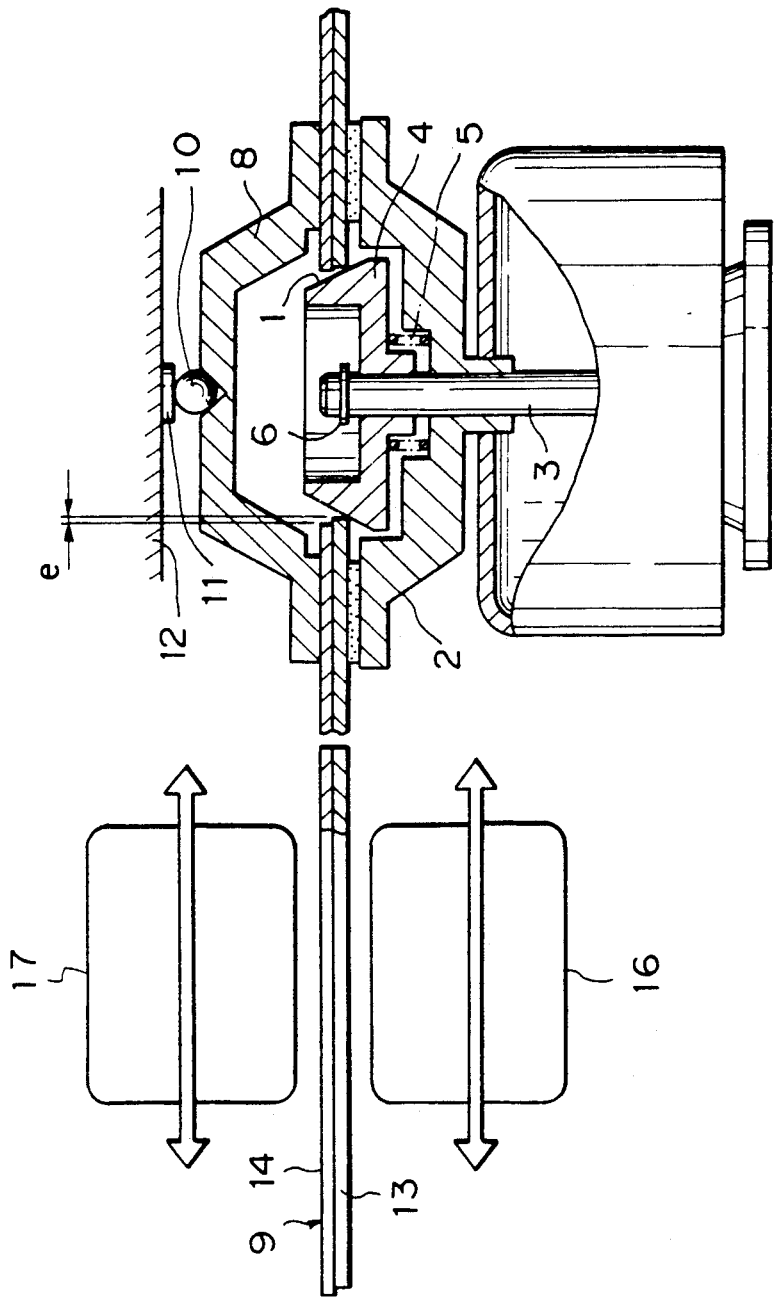
FIG. 1 is a front elevational view, partly in cross section, of a disc clamp mechanism and a disc centering device of a conventional double-sides playable disc player.
Figure 2:
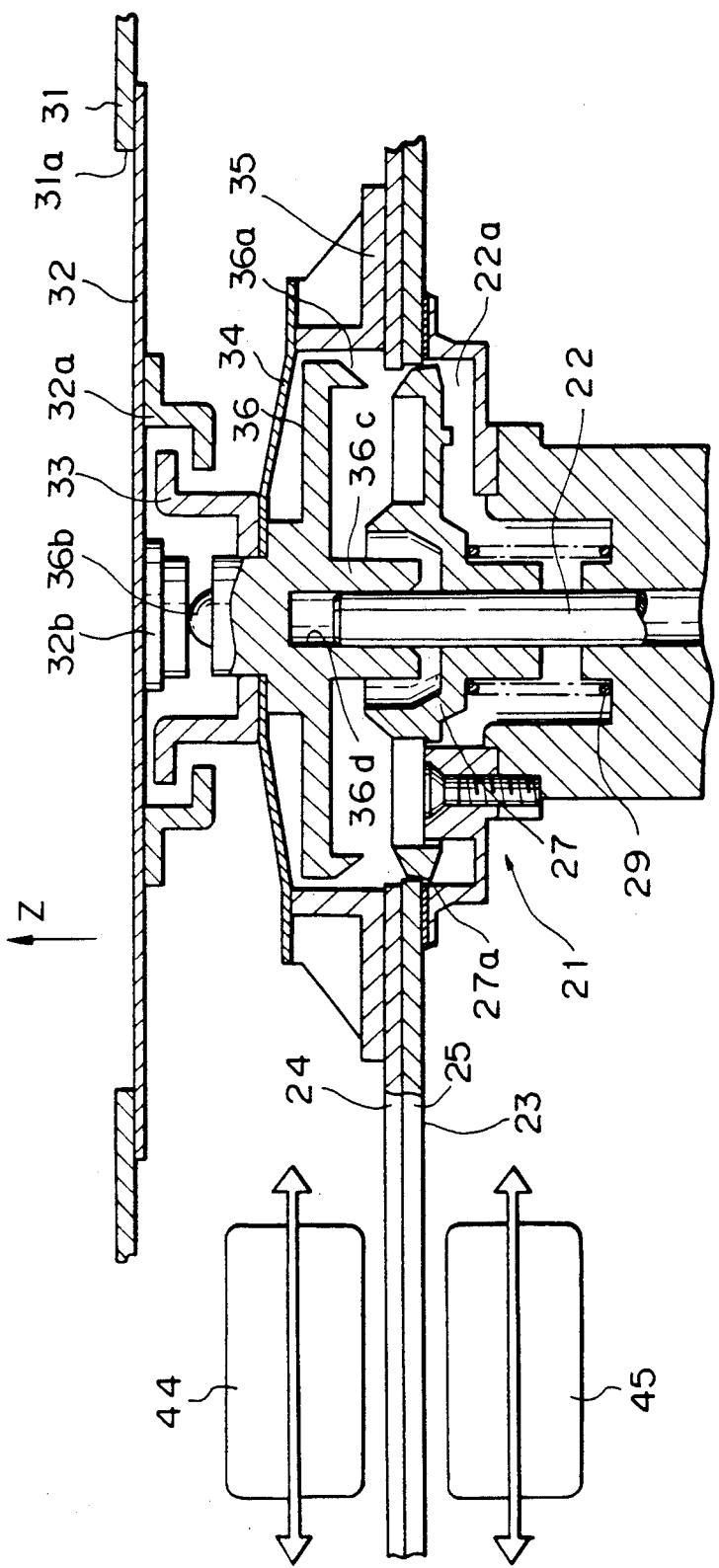
FIG 2 is a front elevational view, partly in cross section, of a disc clamp mechanism and a disc centering device of a double-sides playable disc player according to a first embodiment of the present invention.

As shown in FIG. 2, a double-sides playable disc player according to a first embodiment of the present invention has a turntable 21 fitted over a spindle 22 and rotatable by a motor coupled to the spindle. An information recording disc 23 to be centered with respect to the turntable 22 comprises a pair of circular base plates 24, 25 having respective signal recording layers and central holes and joined to each other with the signal recording layers inside. The turntable 22 has a central recess 22a in which there is disposed a first centering member 27 that is movable along the axis of rotation of the turntable 22 into and out of a disc carrying surface of the turntable 22. The first centering member 27 is slidably fitted over the spindle 22 for being guided thereby. The first centering member 27 has a tapered surface 27a on its outer periphery. The circular base plate 25 of the information recording disc 23 can be centered with respect to the turntable 21 by placing the tapered surface 27a into the central hole of the circular base plate 25 held against the disc carrying surface of the turntable 21. A coil spring 29 is interposed between the turntable 21 and the first centering member 27 for normally urging the first centering member 27 to project outwardly (i.e., upwardly in FIG. 2).

As also shown in FIG. 3, a support member 31 is disposed upwardly of the turntable 21 and movable vertically (in the direction of the arrow Z and the direction opposite thereto) perpendicularly to the disc carrying surface of the turntable 21. The support member 31 has a central opening 31a which is closed off by a leaf spring 32 attached to the support member 31. As illustrated in FIG. 2, a rotatable member 33 is rotatably mounted on the lower surface of the leaf spring 32 by a bracket 32a. A disc-shaped leaf spring 34 serving as a resilient member is centrally fixed to the rotatable member 33. To the outer peripheral edge or free end of the leaf spring 34, there is fixed a presser 35 for pressing the information recording disc 23 against the disc carrying surface of the turntable 21.

As shown in FIG. 4, the leaf spring 34 has a resiliently flexible portion shaped as a partly spherical surface. A second centering member 36 is attached, together with the leaf spring 34, to the rotatable member 33. The second centering member 36 has a tapered surface 36a on its outer periphery which can be fitted into the central hole of the circular base plate 24 of the information recording disc 23 to center the circular base plate 24 with respect to the turntable 21. The second centering member 36 has a semispherical abutment 36b on its upper end which is smoothly slidably held against a seat 32b secured to the lower central surface of the leaf spring 32. The second centering member 36 includes a cylindrical portion 36c projecting from the center thereof toward the turntable 21. The cylindrical portion 36c has a central hole 36d in which the distal end of the spindle 22 is fitted for centering the second centering member 36 with respect to the turntable 21.

Figure 5:
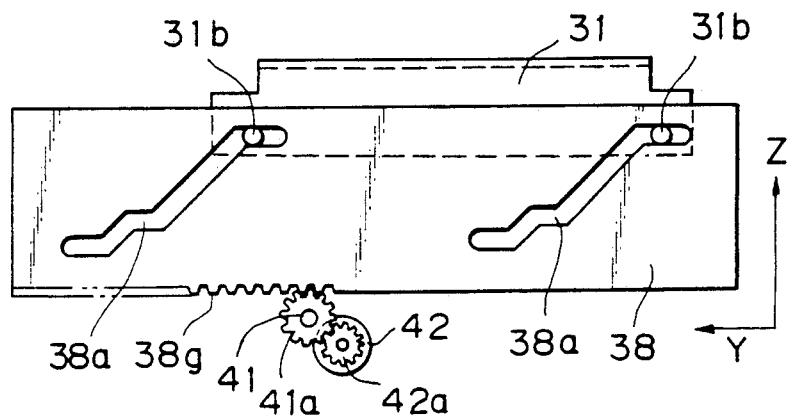
FIG. 5 is a side elevational view of a portion of the disc clamp mechanism illustrated in FIG. 2.

As illustrated in FIG. 3, a pair of rectangular movable members 38, 39 is disposed in laterally sandwiching relation to the support member 31, the rectangular movable members 38, 39 being movable in fore-and-aft directions (i.e., the direction of the arrow Y and the direction opposite thereto). As also shown in FIG. 5, the support member 31 has four projecting pins 31b two on each of lateral side flanges thereof. These pins 31b are slidably fitted in cam grooves 38a, 39a defined in the movable members 38, 39, respectively. The cam grooves 38a, 39a are slanted as a whole downwardly (in the direction opposite to the direction of the arrow Z) in the forward direction (the direction of the arrow Y). Thus, upon fore-and-aft movement of the movable members 38, 39, the support member 31 is caused to move vertically. The cam grooves 38a, 39a are composed of three straight portions 38b, 38c, 38d and 39b, 39c, 39d extending in the directions (the direction of the arrow Y and the direction opposite thereto) in which the movable members 38, 39 are movable, and two slanted portions 38e, 38f and 39e, 39f contiguous to and inclined to the straight portions. Therefore, the cam grooves 38a, 39a are in the shape of a staircase as a whole. In response to movement of the movable members 38, 39, the support member 31 is intermittently moved into two vertically different steps.

The movable members 38, 39 have racks 38g, 39g, respectively, disposed on lower surfaces of front end portions thereof and extending in the directions in which the movable members 38, 39 are movable. A synchronizing shaft 41 is rotatably disposed near the movable members 38, 39 and supports on its opposite ends a pair of gears 41a, 41b held in mesh with the racks 38g, 39g, respectively. The gear 41a meshes with a gear 42a mounted on the output shaft of a motor 42. Therefore, the support member 31 is vertically moved when the motor 42 is energized.

As shown in FIG. 2, a pair of recording/reproducing units 44, 45 is positioned in vertically sandwiching relation to the information recording disc 23 placed on the turntable 1. The recording/reproducing units 44, 45 are guided and moved along the recording surfaces of the information recording disc 23 by guide/drive means (not shown). Signals can be recorded on and reproduced from the signal recording layers of the circular base plates 24, 25 by the recording/reproducing units 44, 45.

Operation of the double-sides playable disc player of the aforesaid construction will be described also with reference to FIGS. 6(a), 6(b), 7, 8, and 9.

Figure 6A:
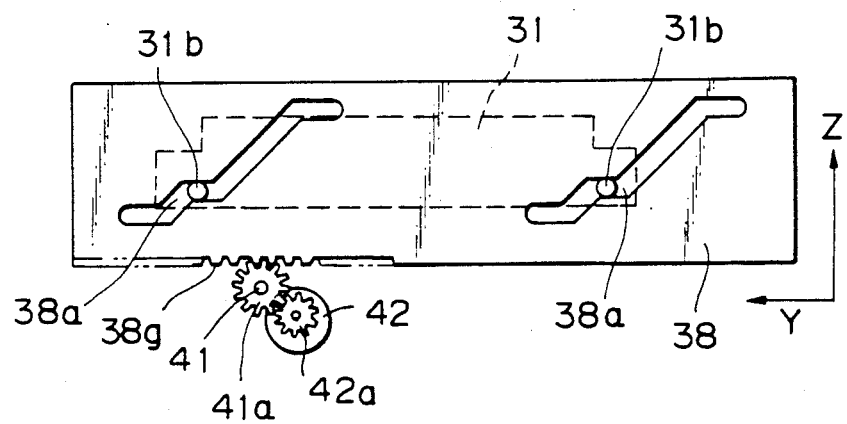
FIGS. 6(a) and 6(b), 7, 8, and 9 are views explaining operation of the disc clamp mechanism and the disc centering device shown in FIG. 2.

For recording information on or reproducing information from the signal recording layer of the circular base plate 25 held against the disc carrying surface of the turntable 21, the motor 42 is energized to move the movable members 38, 49 to a substantially central position in their stroke as shown in FIG. 6(a). The support member 31 is now positioned as shown in FIG. 2 thereby to cause the presser 35 to hold the information recording disc 23 down against the disc carrying surface of the turntable 21 under the pressure developed by the resilient flexure of the leaf spring 34. The tapered surface 27a of the first centering member 27 engages into the central hole of the circular base plate 25 to center the circular base plate 25 with respect to the turntable 21. Information can then be recorded or reproduced by the lower recording/reproducing unit 45 shown in FIG. 2.

Figure 6B:
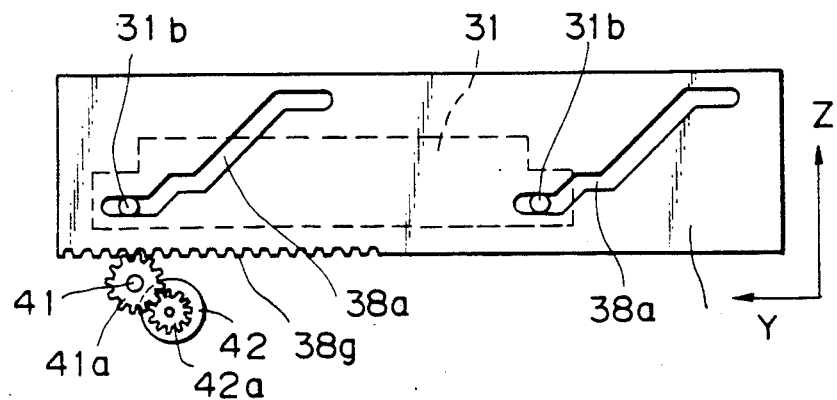
Figure 7:
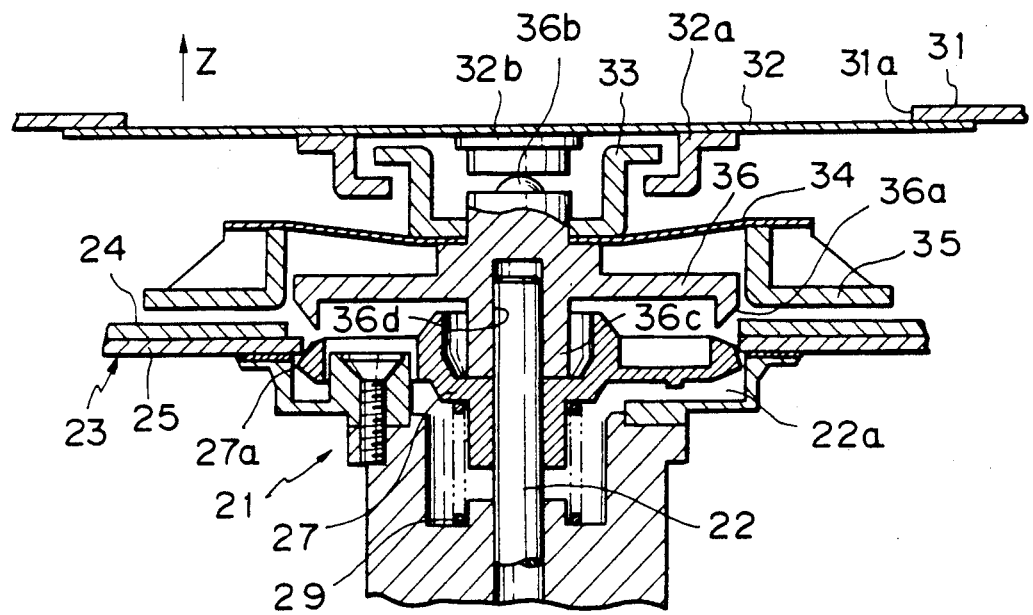
Figure 8:
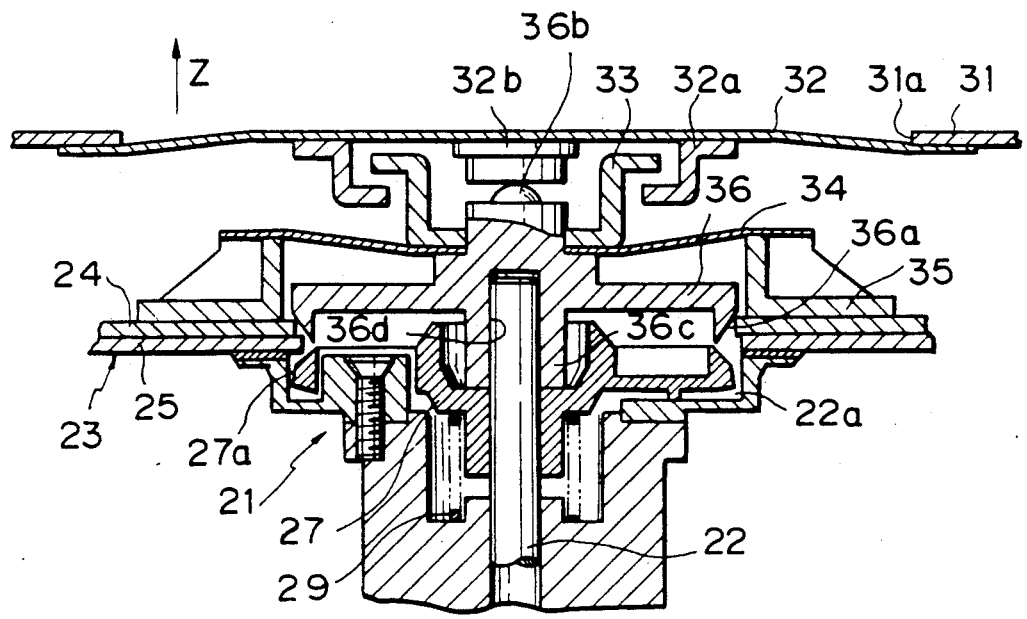
Figure 9:
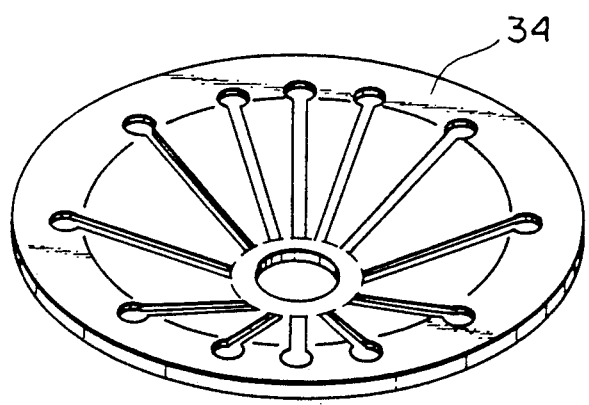

For recording information on or reproducing information from the signal recording layer of the other circular base plate 24, the motor 42 is further energized to displace the movable members 38, 39 downwardly to the final position in their stroke as shown in FIG. 6(b) for thereby assuming the positions of FIGS. 7 and 8. More specifically, the tapered surface 36a of the second centering member 36 is fitted into the central hole of the circular base plate 24. Immediately prior to this, the cylindrical portion 36c of the second centering member 36 abuts against the first centering member 27 to push the latter out of the central hole of the circular base plate 25 downwardly of the disc carrying surface of the turntable 21. This movement centers the circular base plate 24 with respect to the turntable 21. At this time, when the leaf spring 34 flexes an increased amount by the movement of the support member 31 for a certain distance downwardly from the position of FIG. 2 in the direction opposite to the direction of the arrow Z, the leaf spring 34 abruptly toggles from a first stable upwardly convex state downwardly into a second stable downwardly convex state shown in FIGS. 7 and 9, since the flexible portion of the leaf spring 34 is partly spherical in shape. Therefore, the presser 35 attached to the free end of the leaf spring 34 is temporarily released from the information recording disc 23. Thereafter, the support member 31 is further lowered to displace the second centering member 36 into the central hole of the circular base plate 24 as shown in FIG. 8 to center the circular base plate 24 with respect to the turntable 21, and at the same time the information recording disc 23 is clamped on the turntable 21 by the presser 21. Then, information can be recorded on and reproduced from the signal recording layer of the circular base plate 24 by the upper recording/reproducing unit 44 shown in FIG. 2.

If information is thereafter to be recorded on or reproduced from the signal recording layer of the circular base plate 25 again, the movable members 38, 39 are moved from the position of FIG. 6(b) through the position of FIG. 5 to the position of FIG. 6(a). The second centering member 36 is released from the circular base plate 24, and the first centering member 27 is fitted into the central hole of the circular base plate 25, which is thus centered with respect to the turntable 21.

Inasmuch as the leaf spring 35 toggles to reverse its convex shape on the downward movement of the support member 31, the force with which to clamp the disc 23 on the turntable 21 does not increase with the amount of downward movement of the support member 31, but is reduced to zero when the leaf spring 34 toggles. Accordingly, when the first and second centering members 27, 36 center the respective circular base plates 24, 25 with respect to the turntable 21 the disc clamping forces applied to the presser 35 by the leaf spring 34 can be equalized to each other and reduced. As a result, the circular base plates 24, 25 can easily be moved radially so that they can be centered with high accuracy.

The spring used as the resilient member for applying clamping forces to the presser 35 has the opposite ends of its resiliently flexible portion supported between fixed portions thereof which are shorter than the resiliently flexible portion. However, any of various springs, such as a filamentary spring, may be employed as the resilient member insofar as its resiliently flexible portion can toggle between two stable states.

A double-sides playable disc player according to a second embodiment of the present invention will be described below with reference to FIGS. 10 and 11. Those parts of the double-sides playable disc player of the second embodiment which are identical or correspond to those of the double-sides playable disc player of the first embodiment are denoted by identical reference numerals. These identical components and the other parts than described below are identical in construction to the corresponding components and parts of the double-sides playable disc player of the first embodiment, and hence will not be described in detail.

Figure 10:
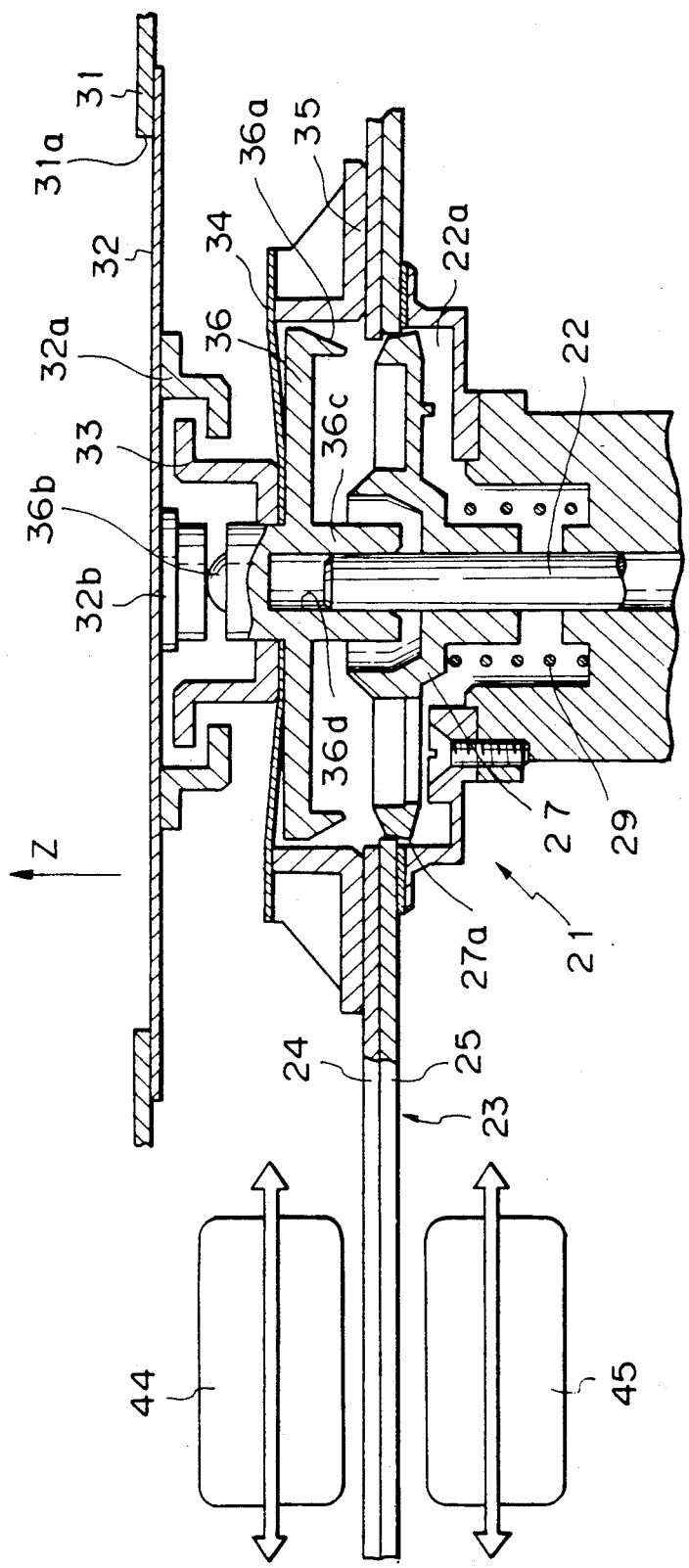
FIG. 10 is a front elevational view, partly in cross section, of a disc clamp mechanism and a disc centering device of a double-sides playable disc player according to a second embodiment of the present invention.
Figure 11:
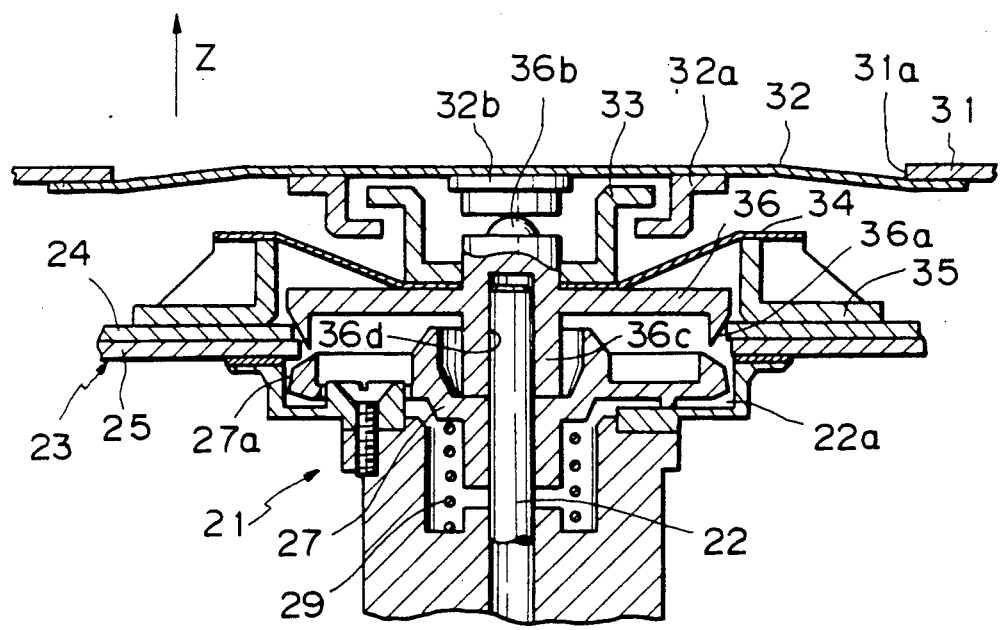
FIG. 11 is a fragmentary cross-sectional view explaining operation of the disc clamp mechanism and the disc centering device shown in FIG. 10.

As shown in FIG. 10, a disc-shaped leaf spring 34 supporting a presser 35 on its free end is downwardly convex when the disc is not clamped. As shown in FIG. 11, when the disc is clamped, the leaf spring 34 does not toggle, but projects downwardly at its central portion.

In each of the double-sides playable disc players of the first and second embodiments, the disc clamp mechanism doubles as a drive means for moving the first and second centering members 27, 36 in order to achieve a reduction in the cost. However, such a drive means and the disc clamp mechanism may separately be provided.

As described above in detail, a double-sides playable disc player includes a disc centering device for centering an information recording disc composed of a pair of circular base plates joined to each other and having respective signal recording layers and central holes, the disc centering device comprising a first centering member movable into and out of a disc carrying surface of a turntable along a central axis of rotation of the turntable, the first centering member being fittable in the central hole of one of the circular base plates which is held against the disc carrying surface, urging means for normally urging the first centering member into the disc carrying surface, a support member movable in a plane substantially normal to the disc carrying surface, drive means for driving the support member, and a second centering member rotatably mounted on the support member and fittable into the central hole of the other circular base plate. When the second centering member is fitted into the central hole of the other circular base plate, the first centering member is released from the central hole of said one circular base plate and moved out of the disc carrying surface of the turntable.

For recording information on or reproducing information from the signal recording layer of said one circular base plate, the first centering member is fitted into the central hole of this circular base plate to center the latter with respect to the turntable. For recording information on or reproducing information from the signal recording layer of the other circular base plate, the second centering member is fitted into the central hole of the other circular base plate to center the latter with respect to the turntable.

Therefore, even if the circular base plates are displaced with respect to each other, they can accurately be centered with respect to the turntable.

The support member and the drive means of the disc centering device may double as components of a disc clamp mechanism for pressing the information recording disc against the turntable in order to accomplish a reduction of the cost.

Moreover, the drive means comprises a movable member having a cam groove engaging the support member and movable in a prescribed direction, and drive force applying means for applying a drive force to the movable member. The cam groove is of such a profile that when the movable member is moved, the support member is also moved. The cam groove is in the shape of a staircase composed of a plurality of straight portions extending in the direction in which the movable member is movable, and slanted portions contiguous and inclined to the straight portions.

The staircase-shaped cam groove causes the support member to move intermittently into two different steps, so that the first and second centering members can be brought selectively into and out of engagement with the information recording disc reliably, highly accurately, and easily.

A resilient member for applying a disc clamping force under its own resilient flexure comprises a spring including a resiliently flexible portion which toggles between first and second stable states. On movement of the support member which supports the spring toward the turntable, the spring toggles from the first stable state to the second stable state. Therefore, the disc clamping force is not continuously increased with the amount of movement of the support member, but is reduced to substantially zero at a transient period when the spring toggles between the two stable states. Consequently, the disc clamping forces applied by the spring when the first and second centering members center the respective circular base plates are substantially equalized to each other and reduced. The circular base plates are therefore easy to move radially and can be centered highly accurately.

Although certain preferred embodiments have been shown and described, it should be understood that many changes and modifications may be made therein without departing from the scope of the appended claims.

What is claimed is:

1. A double-sides playable disc player for playing back an information recording disc, said information recording disc being composed of a pair of circular base plates having respective signal recording layers and central holes and joined to each other with the signal recording layers inside, said double-sides playable disc player comprising a turntable, a disc centering device for centering the information recording disc with respect to said turntable, and a disc clamp mechanism for pressing the information recording disc against said turntable, said disc clamp mechanism comprising a support member movable in a plane substantially normal to a disc carrying surface of said turntable, drive means for driving said support member, a rotatable member rotatably mounted on said support member, and a presser mounted on said rotatable member through a resilient member for pressing said information recording disc against said disc carrying surface, said disc centering device comprising a first centering member fittable in a central hole of one of the circular base plates and movable into and out of said disc carrying surface through said central hole along a central axis of rotation of the turntable, urging means for normally urging said first centering member to project outwardly into the disc carrying surface, and a second centering member rotatably mounted together with a resilient member on said rotatable member and fittable into the central hole of the other circular base plate, the arrangement being such that when said second centering member is fitted into the central hole of said other circular base plate, said first centering member is moved out of said disc carrying surface of the turntable, said resilient member comprising a spring capable of toggling from a first state into a second state.

2. A double-sides playable disc player according to claim 1, wherein when an outer periphery of said second centering member reaches a position near said disc carrying surface, a central portion of said second centering member abuts against said first centering member.

3. A double-sides playable disc player for playing back an information recording disc, said information recording disc being composed of a pair of circular base plates having respective signal recording layers and central holes and joined to each other with the signal recording layers inside, said double-sides playable disc player comprising a turntable and a disc centering device for centering the information recording disc with respect to said turntable, said disc centering device comprising a first centering member fittable in a central hole of one of the circular base plates and movable into and out of a disc carrying surface of said turntable through said central hole along a central axis of rotation of the turntable, urging means for normally urging said first centering member to project outwardly into the disc carrying surface, a support member movable in a plane substantially normal to said disc carrying surface, drive means for driving said support member, and a second centering member rotatably mounted on said support member and fittable into the central hole of the other circular base plate, the arrangement being such that when said second centering member is fitted into the central hole of said other circular base plate, said first centering member is released from the central hole of said one circular base plate and moved out of said disc carrying surface of the turntable, said drive means comprising a movable member having a cam grove engaging said support member and movable in a prescribed direction, and drive force applying means for applying a drive force to said movable member, said cam groove being of such a profile that when said movable member is moved, said support member is also moved, said cam groove being in the shape of a staircase composed of a plurality of straight portions extending in the direction in which said movable member is movable, and slanted portions contiguous and inclined to said straight portions.

* * * * *